United States Patent
Fishwick

(10) Patent No.: US 9,226,013 B2
(45) Date of Patent: Dec. 29, 2015

(54) MULTIMEDIA QUEUE SERVICES

(75) Inventor: Nicholas Fishwick, San Francisco, CA (US)

(73) Assignee: OpenTV, Inc., San Francisco, CA (US)

( * ) Notice: Subject to any disclaimer, the term of this patent is extended or adjusted under 35 U.S.C. 154(b) by 1190 days.

(21) Appl. No.: 11/226,149

(22) Filed: Sep. 14, 2005

(65) Prior Publication Data

US 2006/0056437 A1    Mar. 16, 2006

Related U.S. Application Data

(60) Provisional application No. 60/610,025, filed on Sep. 14, 2004.

(51) Int. Cl.
| | |
|---|---|
| H04L 12/28 | (2006.01) |
| H04L 12/54 | (2013.01) |
| H04N 21/262 | (2011.01) |
| H04N 7/173 | (2011.01) |
| H04N 21/239 | (2011.01) |
| H04N 21/25 | (2011.01) |
| H04N 21/472 | (2011.01) |
| H04N 21/482 | (2011.01) |
| H04L 12/24 | (2006.01) |

(52) U.S. Cl.
CPC ...... *H04N 21/26208* (2013.01); *H04L 12/5693* (2013.01); *H04N 7/17336* (2013.01); *H04N 21/2393* (2013.01); *H04N 21/252* (2013.01); *H04N 21/262* (2013.01); *H04N 21/47202* (2013.01); *H04N 21/47214* (2013.01); *H04N 21/482* (2013.01); *H04L 41/069* (2013.01)

(58) Field of Classification Search
USPC .................................................. 725/86–92
See application file for complete search history.

(56) References Cited

U.S. PATENT DOCUMENTS

| | | | |
|---|---|---|---|
| 7,403,910 B1 * | 7/2008 | Hastings et al. | 705/26 |
| 2003/0023504 A1 | 1/2003 | Berenson et al. | |
| 2003/0063562 A1 * | 4/2003 | Sarkinen et al. | 370/230 |
| 2003/0221198 A1 * | 11/2003 | Sloo | 725/136 |
| 2004/0109675 A1 * | 6/2004 | Tsukidate | 386/83 |
| 2004/0111756 A1 * | 6/2004 | Stuckman et al. | 725/142 |
| 2004/0133907 A1 * | 7/2004 | Rodriguez et al. | 725/14 |

(Continued)

FOREIGN PATENT DOCUMENTS

| | | |
|---|---|---|
| JP | 9018858 | 1/1997 |
| JP | 11296490 | 10/1999 |

(Continued)

OTHER PUBLICATIONS

"International Search Report and Written Opinion for Application No. PCT/US2005/032634, mailed Jan. 12, 2006", 15 pgs.
"International Application Serial No. 2005284897, First Examiner's Report mailed Mar. 13, 2008", 11 pgs.

(Continued)

*Primary Examiner* — Brandon Renner
(74) *Attorney, Agent, or Firm* — Schwegman Lundberg & Woessner, P.A.

(57) ABSTRACT

Techniques are presented for providing multimedia queue services. A multimedia queue manager manages queues of subscribers. The queues include selections for multimedia. The multimedia queue manager schedules broadcasts for the selections and informs recording devices of the subscribers to record the selections during those broadcasts. Moreover, the multimedia queue manager updates the queues in response to actions of the subscribers and/or actions of the recoding devices of the subscribers.

11 Claims, 6 Drawing Sheets

(56) References Cited

U.S. PATENT DOCUMENTS

| | | |
|---|---|---|
| 2004/0187160 A1* | 9/2004 | Cook et al. ............... 725/94 |
| 2004/0197082 A1* | 10/2004 | Yim ............... 386/83 |
| 2004/0215733 A1* | 10/2004 | Gondhalekar et al. ....... 709/207 |
| 2004/0221055 A1* | 11/2004 | Liebenow ............... 709/231 |
| 2004/0243479 A1* | 12/2004 | Gross ............... 705/26 |
| 2005/0149987 A1* | 7/2005 | Boccon-Gibod et al. ..... 725/135 |

FOREIGN PATENT DOCUMENTS

| | | |
|---|---|---|
| JP | 2004127138 | 4/2004 |
| JP | 2004194136 | 7/2004 |
| JP | 4975623 | 4/2012 |
| WO | WO-03013139 A1 | 2/2003 |
| WO | WO-03013139 A1 | 2/2003 |
| WO | WO-2004073269 A1 | 8/2004 |
| WO | WO-2006031845 A1 | 3/2006 |

OTHER PUBLICATIONS

European Application No. 05796177.3 Office Action received, (Jul. 5, 2007), 8 pgs.

"U.S. Appl. No. 11/226,149, Advisory Action mailed Jun. 10, 2009", 3 pgs.

"European Application Serial No. 05796177.3, Summon to attend Oral Proceeding mailed Dec. 1, 2010", 7 pgs.

"Japanese Application Serial No. 2007-531457, Office Action mailed May 25, 2010", 3 pgs.

"Japanese Application Serial No. 2007-531457, Office Action Mailed Jul. 12, 2011", 3 pgs.

"Japanese Application Serial No. 2007-531457, Response filed Oct. 11, 2011 to Office Action mailed Jul. 12, 2011", 14 pgs.

"QUEUE Data structure", Retrieved from the internet on Sep. 30, 2010, anonymous, no publication date, URL: http://en.wikipedia.org/wiki/queue.

* cited by examiner

MULTIMEDIA QUEUE SERVICES

RELATED APPLICATIONS

The present application claims the benefit of U.S. Provisional Application No. 60/610,025 filed Sep. 14, 2004, entitled "Movie Queues Service", the disclosure of which is incorporated by reference herein.

FIELD

The invention relates generally to multimedia processing and more particularly to techniques for managing and delivering multimedia via queue services.

BACKGROUND

The delivery of multimedia (e.g., text, audio, graphics, images, video, television, etc.) has experienced tremendous growth and advances in recent years. For example, cable providers have launched a variety of Video on Demand (VOD) services, where subscribers can select movies to view at a date and time of their liking. As still a further example, subscribers may receive live television feeds or replays of television programming via World Wide Web (WWW) browsers or media players over the Internet.

One problem associated with providing VOD and other multimedia data services on demand, is that bandwidth may quickly be overcome with popular programming or multimedia selections being downloaded. For example, if a movie is hugely popular, then it may be selected by a large number of subscribers to view at roughly the same point in time. This can cause the network to degrade and subscribers may become frustrated with the delays experienced by them in waiting for their desired movie to arrive on their devices or subscribers may be frustrated with interruptions that they may experience if the desired movie is being streamed to multimedia players of the subscribers.

Another problem is that selections may be scheduled for broadcast, such that rather than having to download a selection over the network, the selection could easily be recorded by a subscriber and stored locally for subsequent consumption. However, communicating broadcast schedules or relying on subscribers to set their recording devices for recording at a time of the broadcast is often not practical with current techniques used in the industry. As a result, a selection may have to be repetitively rebroadcast or downloaded before each subscriber desiring the selection has it for viewing.

Moreover, not only is distribution cost a factor for a broadcaster in supplying multimedia on demand, but subscriber satisfaction is also a significant factor for the broadcaster. Subscribers to multimedia may become disgruntled with a provider because performance or response time for desired selections is not acceptable to them. So, customer satisfaction and loyalty can be adversely impacted if selections are not delivered in an acceptable fashion to the subscribers. This may mean that even when a broadcaster resolves its distribution expenses in an acceptable manner that a subscriber may be satisfied with, a previously disgruntled subscriber may be long gone and unlikely to be swayed to return to that broadcaster.

SUMMARY

In various embodiments, techniques for providing multimedia queue services are taught. In an embodiment, a multimedia queue service system is taught. The multimedia queue service system includes a multimedia queue manager and a plurality of queues. The multimedia queue manager manages the queues, where each queue is associated with a subscriber. The multimedia queue manager also schedules broadcasts of selective multimedia and informs subscribers, via entries in their corresponding queues, of the broadcasts. Furthermore, the multimedia queue manager informs subscribers, via their entries in their respective queues, of predicted availability for particular multimedia identified in the entries of the queues.

DETAILED DESCRIPTION

Figure 1:
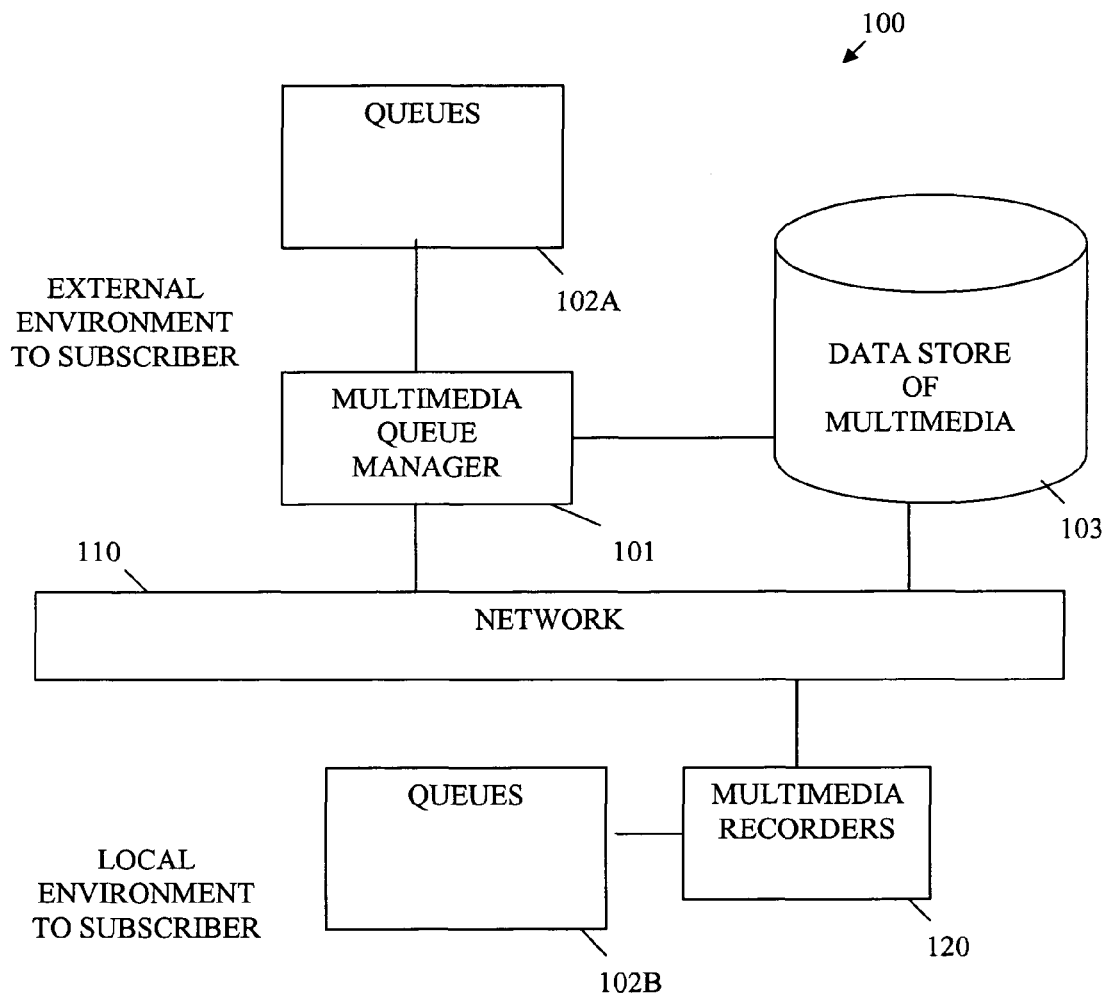
FIG. 1 is a diagram of a multimedia queue service system, according to an example embodiment.

FIG. 1 is a diagram of a multimedia queue service system 100, according to an example embodiment. The multimedia queue service system 100 is implemented in a machine-accessible or computer-readable medium and is accessible over a network.

FIG. 1 is presented for purposes of illustration only and is not intended to limit embodiments of the multimedia queue service system 100, since it is readily apparent that some components of the FIG. 1 may be subsumed into other components, that additional components may be added, that some components may be situated differently, and/or that some components may be deleted; all without departed from the beneficial teachings presented herein and below.

The multimedia queue service system 100 includes a multimedia queue manager 101, and a plurality of queues 102A-102B. In some embodiments, the multimedia queue service system 100 may also include a data store 103. Each of these will now be discussed in turn.

The multimedia queue manager 101 process in an environment that is external to subscribers. Subscribers are consumers of multimedia. The multimedia may include combinations or text, audio, video, television, graphics, images, interactive applications or services, and the like. In an embodiment, the environment of the multimedia queue manager 101 is the same environment as a broadcaster. A broadcaster is an entity or service that broadcasts multimedia and permits multimedia on demand or Video on Demand (VOD). To broadcast the multimedia the broadcaster uses a network 110 and network communications, such as satellite, cable, Internet, Digital Subscriber Line (DSL), Cellular, Radio Frequency (RF), T1, or a variety of other wired, wireless, or combination of wired and wireless. In an embodiment, the broadcaster is a satellite provider of television services to subscribers, where the network 110 is satellite based.

The multimedia queue manager 101 interacts with and manages queues 102A within its environment. The queues 102A correspond to other duplicate queues 102B residing within a local environment of the subscribers. Each subscriber is associated with a queue 102A and 102B. The queue manager 101 keeps the two versions of a particular queue 102A and 102B in synchronization with one another by interacting with services processing in a subscriber's environment over the network 110.

In an embodiment, these services process on multimedia recorder 120; that recorder 120 may be a personal video recorder (PVR), a digital video recorder (DVR), a set-top box (STB) capable of recording multimedia, or any processing device enabled for network communications and enabled to record and in some cases play multimedia.

Each subscriber has two duplicate versions of a particular queue 102A and 102B. One is initially and locally managed, such as by a multimedia recorder 120, the other is directly managed by the multimedia queue manager 101. Also, the multimedia queue manager 101 keeps the two duplicate versions in synchronization. This may occur by directly inspecting a queue 102B within the environment of the subscriber or by interacting with a multimedia recorder 120 or STB of the subscriber by receiving event notifications of changes in a queue 102B, so as to permit updates to occur in the corresponding queue 102A.

It is however to be understood, that in some cases a single queue 102A or 102B may exist and that single queue 102A or 102B may reside in the external environment to the subscriber or the local environment of the subscriber. Metadata or control data may be used within the environment not have the single queue 102A or 102B to effectively manage and consume information associated with the single queue 102A or 102B and to keep the single queue 102A or 102B in synchronization between the two environments. Therefore, although FIG. 1 shows two duplicate queues, one of ordinary skill in the art recognizes that alternative approaches or techniques are possible and such alternatives are intended to fall within the scope of the embodiments presented herein.

Each non-empty entry within the queue 102A and 102B includes metadata. The metadata may include a variety of information, such as a description and/or identifier for a particular selection of the multimedia; a flag indicating if the selection has been downloaded and recorded by the subscriber, such as via a multimedia recorder 120; and/or availability information for the selection if that selection is not yet available.

This information within the non-empty entries of the queue 102A and 102B is managed and inspected by the multimedia queue manager 101 and is consumed by the subscriber to view multimedia selections that they have selected to view or have recorded. Consumption may occur via a STP, a multimedia recorder 120, or any other service processing within the local environment of the subscriber and enabled to read and process the information of the queue 102B for purposes of presenting the information in visual and/or audio format on a display and/or audio enabled device, such as monitors, televisions, speakers, etc.

A queue 102A and 102B is initially populated by a subscriber. In an embodiment, the subscriber is presented with an interface, via a STB or any other processing device, where a catalogue or data store 103 of available multimedia selections (e.g., movies, old television programs, presentations, etc.) are available for viewing and recording within the local environment of the subscribers. The subscriber may use selection devices, such as remotes, keypads, and the like to query the data store 103 and make selections of multimedia archives or data store 103. The selections are stored in the subscriber's queue 102A and 102B.

The multimedia queue manager 101 detects non-empty entries in a subscriber's queue 102A and then decides whether the selection of multimedia included within the entry is immediately available for recording by the subscriber, is currently scheduled for a broadcast, or is to be scheduled for a broadcast.

The multimedia queue manager 101 then communicates over the network 110 with a service within the local environment of the subscriber or the subscriber's multimedia recorder 120 and directs one of these entities to record the broadcast of a selection or set a recording to occur for a selection identified within an entry of the subscriber's queue 102A and 102B.

Instructions communicated by the multimedia queue manager 101 may tell the service or recorder 120 to record on a define channel for a certain calendar date, at a certain time of day, and for a certain length of time. It should also be noted that because the broadcast for a given multimedia selection may accommodate all existing subscribers that desire that selection and because the multimedia queue manager 101 determines schedules and interfaces with services or recorders 120 within the local environments of those subscribers, a broadcast can be optimized in a number of manners determined most beneficial by the multimedia queue manager 101.

Thus, the multimedia queue manager 101 may evaluate a variety of factors in determining when a broadcast for a given selection should occur. Some of these factors may include, but are not limited to, a price paid by subscribers for a given selection to be broadcast, a total number of subscribers that desire to purchase the given selection, a bandwidth load and existing schedule of a broadcaster that will perform the broadcast, a cost associated with performing the broadcast, wait times experienced by subscribers that have been waiting for the given selection to become available, probability of successful broadcast based on collected history, probability of consumption by the subscriber based on a different collected history etc. The multimedia queue manager 101 uses the factors and any custom algorithms to optimize when it is most beneficial to the broadcaster and subscriber to receive the broadcast of a given selection for recordings in an acceptable timeframe. The custom algorithms may also include the impact of customer satisfaction in being excessively delayed in receiving a desired broadcast.

In an embodiment, the broadcast itself may not be a single contiguous block of time for a given selection that occurs on a single channel. In other words, the broadcast may be logically viewed as a series of sub-broadcasts. In fact, the given selection may be broadcast in different orders such that the middle of the selection broadcast first, the end second, and the first part last. The multimedia queue manager 101 maintains the schedules of what is needed by subscribers according to their queues 102A and 102B and knows what portion of a selection to be broadcast, how sub-broadcasts should be managed, etc. In these embodiments having discontinuous and sub-broadcast features, the services or recorders 120 within the local environment of the subscribers are enabled to reorder and assemble a given selection into a contiguous selection for storage and viewing by the subscribers.

If a given selection within an entry of a subscriber's queue 102A and 102B does not have an existing broadcast scheduled, then the multimedia queue manager 101 is enabled to determine when a broadcast will occur or predict when it will occur. This information may then be updated to the entry of the queue 102A and 102B, such that an affected subscriber can see that a given selection is predicted to be available for recording on a certain date and time. As predictions are validated or modified when the multimedia queue manager 101 modifies or generates firm schedules then updates are made to the entry of the queue 102A and 102B to properly inform the affected subscribers of the changes.

Thus, the multimedia queue manager 101 is designed to keep the queues 102A and 102B in synchronization, generate schedules for broadcasts, determine when a broadcast should include discontinuous or sub-broadcasts, update information viewable by the subscribers in the queues 102A and 102B, and predict when broadcasts may occur if no schedule is yet available.

The multimedia queue service system 100 is particularly beneficial with VOD for Satellite 110 and/or Cable 110 providers, since this allows archives of movies or television selections to be broadcast in a cost effective manner at a single time to accommodate a large swath of subscribers. This process is optimized by the multimedia queue manager 101. As a single broadcast occurs, or series of sub-broadcasts that logically represents a single broadcast, subscribers' PVR's 120 are automatically set to record and/or to assemble the movies and make them available to the subscribers within the local environments of the subscribers. It is also to be understood that the techniques are also beneficial with other networks 110 (e.g., Internet, etc.) and with other media recorders/players 120 (e.g., Real Player®, etc.).

Figure 2:
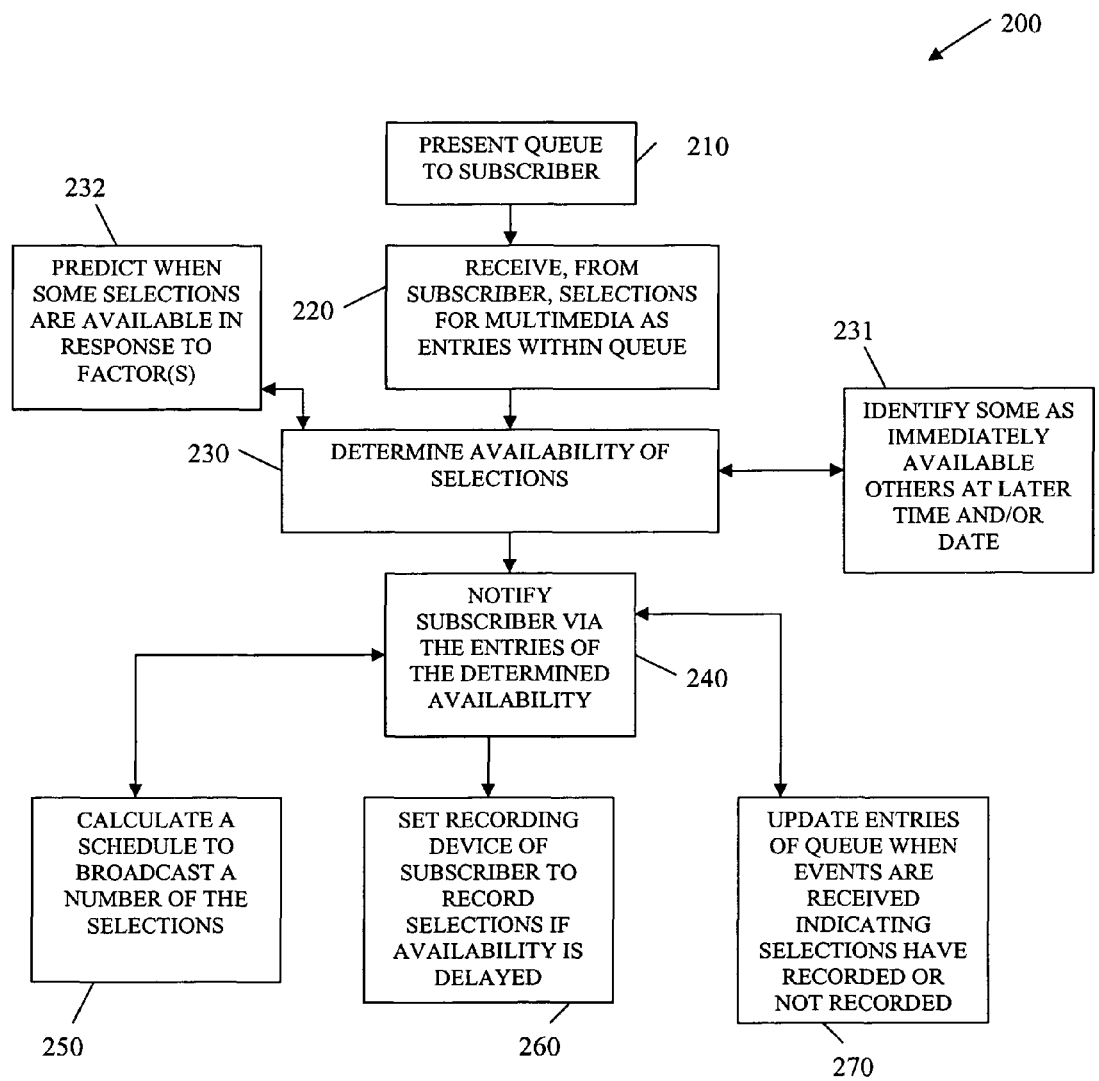
FIG. 2 is a diagram of a method for a multimedia queue management service, according to an example embodiment.

FIG. 2 is a diagram of a method 200 for a multimedia queue management service, according to an example embodiment. The method 200 (hereinafter "multimedia queue management service") is implemented in a machine-accessible and readable medium. In an embodiment, the processing of the multimedia queue management service represents processing of the multimedia queue manager 101 of the multimedia queue service system 100 of FIG. 1.

At 210, the multimedia queue management service presents a queue to a subscriber for subscriber population and modification. Initially, the queue is empty or null until the subscriber takes one or more actions to populate the queue. Additionally, although the term "queue" is used, the concept of "queue" may be synonymous with "list" or any structure that a subscriber would comprehend as a repository associated with the subscriber to house selections and information about selections, where a selection is multimedia. Different multimedia is catalogued in a repository that the subscriber may search and/or browse.

At 220, the multimedia queue management service receives selections for multimedia from the subscriber; these selections are received in or associated with entries of the subscriber's queue. Once entries of the queue are populated with selections from a subscriber, the multimedia queue management service, at 230, determines availability for the selections.

The multimedia queue management service may determine availability in a number of manners. For example, at 231, it may be determined that some selections are immediately available, indicating that these selections are being broadcast immediately and can be recorded immediately. Alternatively, at 231, it may be determined that other selections are scheduled to be broadcast and available at a later calendar date and/or time. In still other embodiments, at 232, it may be determined that no schedule exists for some selections and in these cases a prediction is made as to when it estimated that these selections may be broadcast.

Once the multimedia queue management service determines the availability of the selections within the entries of the queue, at 240, the multimedia queue management service notifies or communicates with the subscriber via the entries of the queue with information to indicate to the subscriber when available is to occur or is predicted to occur. This allows the subscriber to know what the plan is to receive their desired multimedia selections.

In an embodiment, at 250, the multimedia queue management service may calculate a schedule to broadcast a number of the selections. A variety of factors may be used to optimize the schedule for purposes of achieving the proper balance between revenues of a broadcaster and expectations or satisfaction of the subscribers. Example factors and techniques to strike this proper balance were presented above with the multimedia queue service system 100. Furthermore, the broadcast may actually be a series of sub-broadcast that logically represents a single broadcast.

According to an embodiment, at 260, the multimedia queue management service may set a recording device of a subscriber to record the selections if availability is delayed. In other words, the multimedia queue management service instructs the recording devices to record a broadcast or sub-broadcasts on defined channels for a certain calendar dates, at certain times of the day, and for certain lengths of time. This interaction may be automatic requiring no subscriber intervention. In other cases, a manual confirmation may be used to have the subscriber commit to setting the recording device.

In yet another embodiment, at 270, the multimedia queue management service updates entries of the queue when events are received. The events may indicate a variety of circumstances occurring within the local environment of the subscriber. For example, an event may indicate that a recording succeeded or failed. For a failure, the multimedia queue management service may reattempt to set a recording device to record when the selection that failed to record is broadcast again. For a success, the entry queue may be updated so that the subscriber sees the multimedia selection is available on his/her recording device for immediate viewing or playing. Other events may indicate that the subscriber deleted entries of his/her queue and/or added selections to entries of his/her queue.

Figure 3:
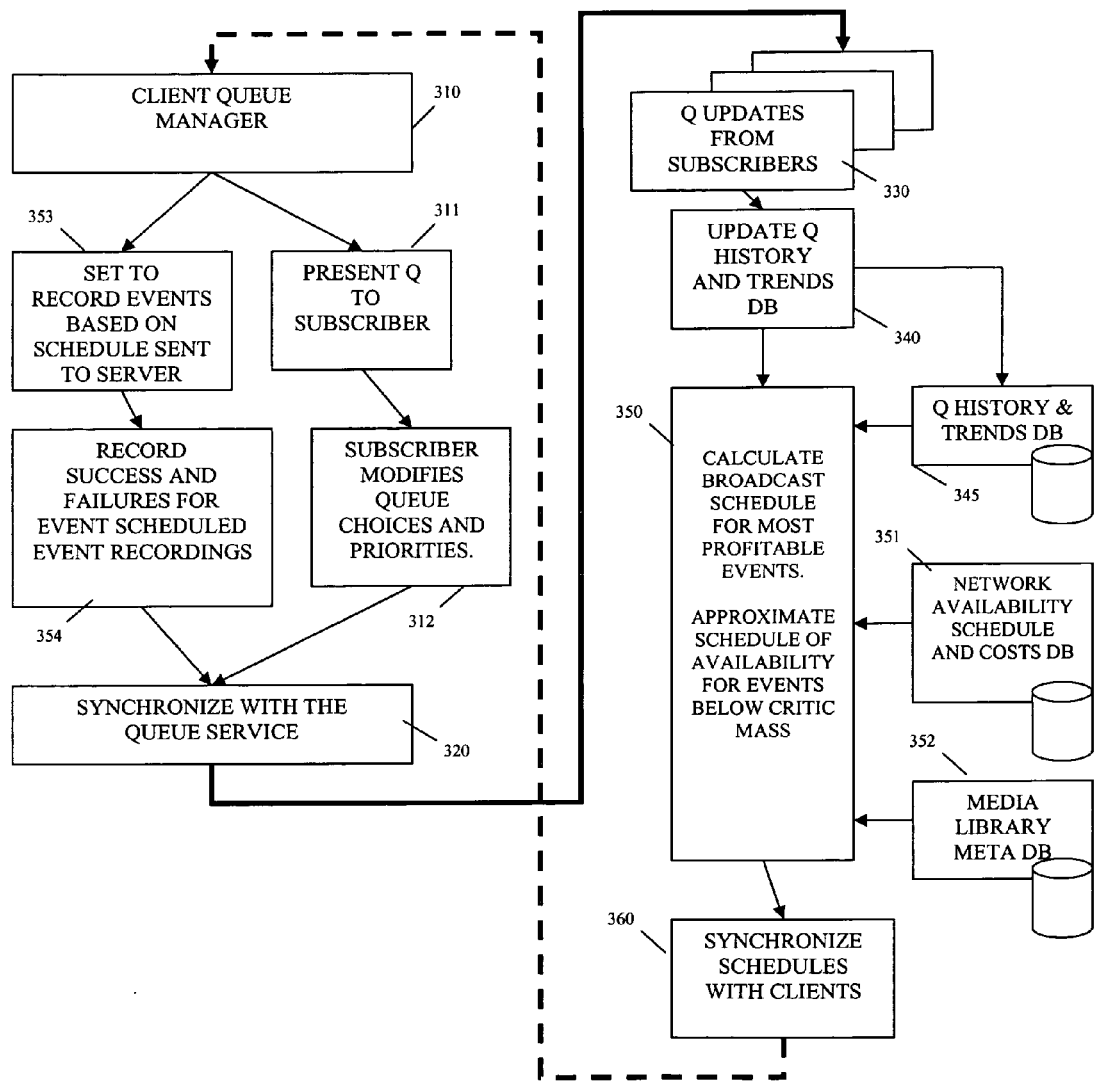
FIG. 3 is a diagram representing some resources and a different example perspective of the multimedia queue management service processing of FIG. 2, according to an example embodiment.

FIG. 3 is a diagram representing some resources and a different example perspective of the multimedia queue management service processing of FIG. 2, according to an example embodiment. The resources and the processing of the multimedia queue management service are implemented in a machine-accessible and readable medium and are accessible over a network.

In FIG. 3, the client queue manager 310 represents the queue management service processing of FIG. 2 and provides a more detailed view of processing and synchronization of some of that processing.

Initially, at 311, a queue is presented to a subscriber. At 312, the subscriber modifies the queue choices and, perhaps, queue priorities. The queue is then synchronized, at 320.

At 330, queue updates may be received periodically from the subscribers. In an embodiment, at 340, this information may be used to update a queue history and trends in a database or data store 345.

At 350, a broadcast schedule for most profitable events to the broadcaster and the subscriber is calculated. This may entail accessing a scheduling and cost database 351. Also, at 350, the schedule may be approximated for events below a critical mass. To achieve this, a media library and metadata database 352 may be consulted.

At 360, schedules are synchronized with subscribers or clients and communicated to the client queue manager 310. Now, at 361, events may be set to record on subscriber devices for the events based on the set schedule. The recording is then attempted, at 362, and success or failure of that attempt is noted and fed to the processing, at 320, that again synchronizes the queues.

Again, FIG. 3 is presented for purposes of illustrating the queue management service of FIG. 2 and some resources that may be consulted in a different manner and from a different perspective. It is presented for purposes of illustration and comprehension.

Figure 4:
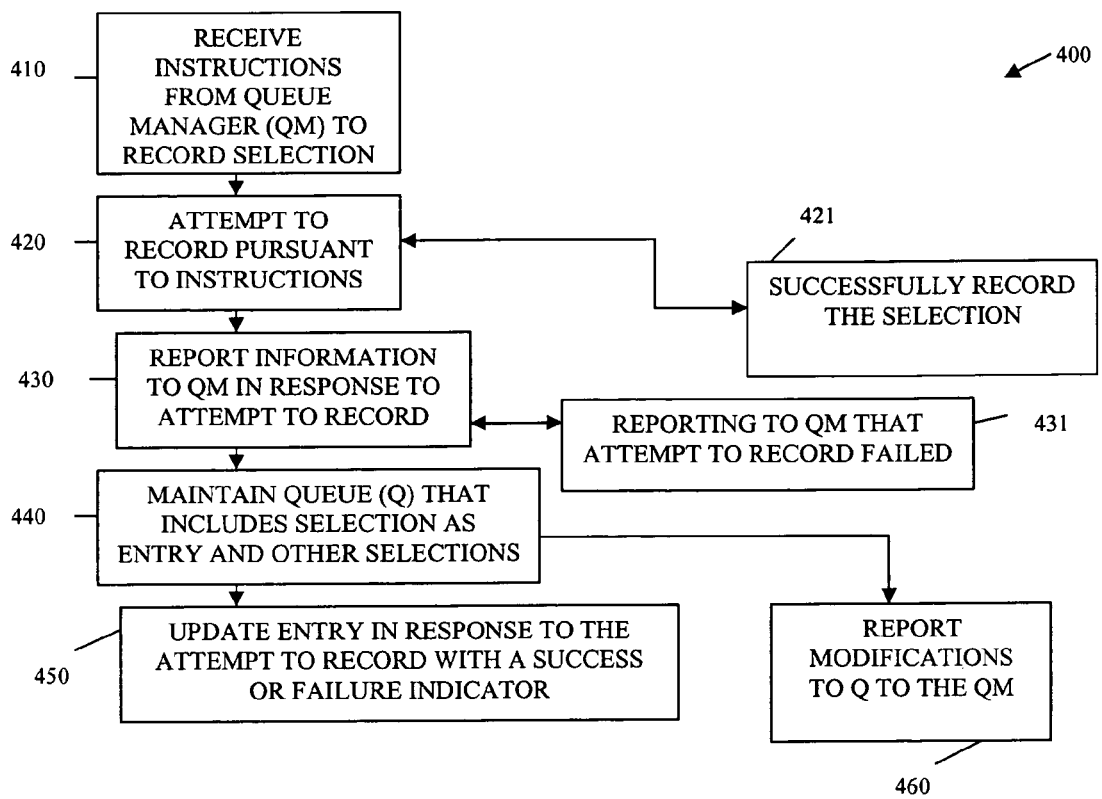
FIG. 4 is a diagram of a method for a subscriber queue service that interacts with the multimedia queue management service of FIG. 2, according to an example embodiment.

FIG. 4 is a diagram of a method 400 for a subscriber queue service that interacts with the multimedia queue management service of FIG. 2, according to an example embodiment. The method 400 (herein after "subscriber queue service") is implemented in a machine-accessible and readable medium. In an embodiment, the subscriber queue service represents processing of a subscriber's multimedia recorder that interacts with the multimedia queue management service represented by the method 200 of FIG. 2. According to an embodiment, the interactions occur over a network (e.g., wired, wireless, or combination of wired and wireless). In an embodiment, the network is a satellite network or a cable network. In other embodiments, the network is cellular, telephone based, or Internet based.

At 410, the subscriber queue service receives instructions from a queue manger (QM) to record a selection for multimedia. The selection was identified in an entry of a queue. The queue is associated with a given subscriber. Information about the queue is maintain and changed within the local environment of the subscriber and also within an external environment that is separate from the subscriber and local to the QM. In an embodiment, the QM is the multimedia queue manager 101 of the multimedia queue service system 100. In still another embodiment, the processing of the QM is represented by the method 200 of FIG. 2.

The received recording instructions are processed on a recording device within the local environment of a subscriber. The instructions may include information such as record on a defined channel on a defined calendar date at a defined time and for a defined length of time. In some cases, the instructions may be more complex information the subscriber queue service to set the recording device to record multiple times for a single selection and to also assemble the selection once all recordings have successfully recorded. These complex instructions are associated with sub-broadcasts that represent a single logical broadcast, as presented above with the descriptions of FIGS. 1 and 2.

At 420, the subscriber queue service attempts to record pursuant to the received instructions. A variety of circumstances may prevent a recording from occurring a set time. For example, the broadcast service may be down due to a storm, power interruption, etc. As another other example, a subscriber may have his/her recording device powered off or it may malfunction for some reason. Assuming services and equipment are operation as expected, then, at 421, a successful recording of a given selection occurs.

At 430, the subscriber queue service reports information to the QM in response to the attempt to record. In some embodiments, the information is passed as messages or events to the QM over the network. In other cases, the information is passed as added metadata or detail to a particular entry of the subscriber queue that was associated with the selection, and the QM synchronizes with the queue on a periodic or regular basis. In embodiments, at 431, where an attempt failed to record, the subscriber queue service may also communicate the failure via events, messages, or updates to queue entries.

According to an embodiment, at 440, the subscriber queue service maintains the selection as an entry within the subscriber's queue and that queue also includes a variety of other entries having different multimedia selections. Each entry may include different information that is kept in synchronization via communication between the QM and the subscriber queue service. Thus, some entries may be associated with scheduled broadcasts for recording, some may include successful recordings immediately available, some may include predicted broadcast, and some may include failed recordings awaiting future scheduling or prediction.

In some embodiments, at 450, entries are updated in response to the attempts to record to indicate whether a success or failure occurred in the manners discussed above. In other instances, at 460, the subscriber queue service reports modifications to the queue to the QM using a variety of techniques discussed above as well.

The subscriber queue service processes within the local environment of the subscriber. It may be that the subscriber queue service processes on a recording device of the subscriber, such as, by way of example only, a PVR. In other cases the subscriber queue service may process on a STB, computer, or any other processing device and communicate with a recording device of the subscriber. The subscriber queue service communicates over a network with the QM to receive instructions about recording selections and to keep subscriber queues in synchronization with the QM.

Figure 5:
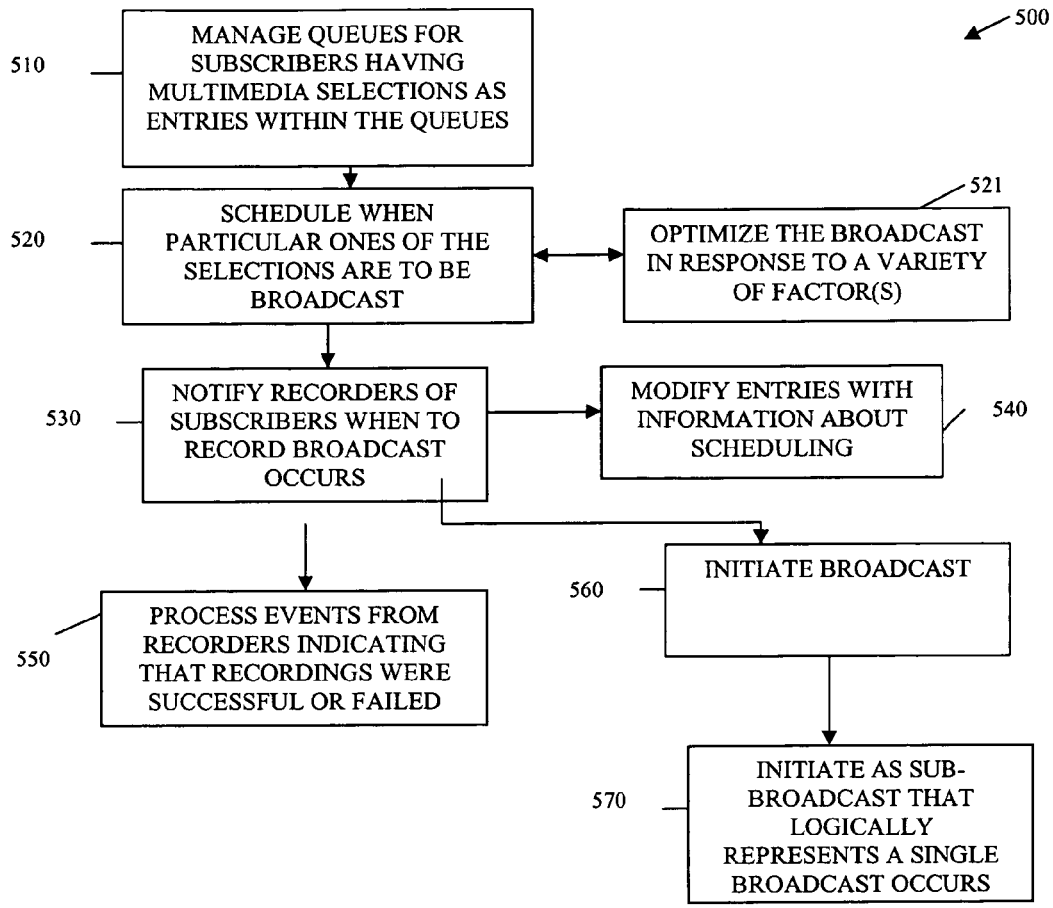
FIG. 5 is a diagram of a method of another multimedia queue management service, according to an example embodiment.

FIG. 5 is a diagram of a method 500 of another multimedia queue management service, according to an example embodiment. The method 500 is implemented as instructions in a machine-accessible and readable medium. When the instructions are executed by a machine, the processing of the instructions presents an alternative view to the processing of the method 200 of FIG. 2. Also, in an embodiment, the processing of instructions represents the processing of the multimedia queue manager 101 of the multimedia queue service system 100 of FIG. 1.

The medium may be removable, fixed storage, and/or memory associated with a device. So, the medium may be interfaced to a machine and uploaded, acquired by the machine over a network as a download, or acquired from existing storage or memory of a machine. When the machine loads and accesses the instructions, the processing depicted in FIG. 5 is enabled within the machine.

At 510, the instructions manage queues for subscribers. The queues are lists of multimedia selections for subscribers. Each entry within the queue may include a multimedia selection or may be empty. Other metadata may be included in the non-empty entries to convey information to the subscribers or the instructions. In an embodiment, a subscriber accesses a catalogue of multimedia selections and uses a selection device or input device to associated desired selection with entries of his/her queue or list.

At 520, the instructions schedule when particular ones of the selections are to be broadcast. The instructions interact with a broadcast schedule of a broadcaster for purposes of developing the schedule. In an embodiment, at 521, the instructions may also be enabled to optimize when the broadcast is to occur based on or in response to a variety of factors. Examples of this optimization and the factors were presented above with respect to FIGS. 1 and 2.

At 530, the instructions notify recorders associated with the subscribers as to when a broadcast is to occur. This permits services on the recorders or services interfaced to the recorders within the local environments of the subscribers to make a setting to record the broadcast. An example service for performing this communication with the instructions and to set the recording was presented above with the method 400 of FIG. 4.

In an embodiment, at 540, the instructions may modify entries of the queues with information about the scheduling. The information may be viewed descriptively by the subscribers so as to set expectations as to when certain multimedia selection are to become available on the local recorders of the subscribers.

According to an embodiment, at 550, the instructions may also dynamically and in real time process events that are received from the recorders. Some of these events may include indications of successful recordings or indications or unsuccessful recordings. Examples of these events and other events were presented above with FIG. 4.

In yet another embodiment, at 560, the instructions may initiate or cause the initiation of a scheduled broadcast with the broadcaster. In some cases, at 570, the initiating may actually be for a series of sub-broadcasts that represent a single logical broadcast. Examples of such a scenario were provided above with respect to FIGS. 1-4.

Figure 6:
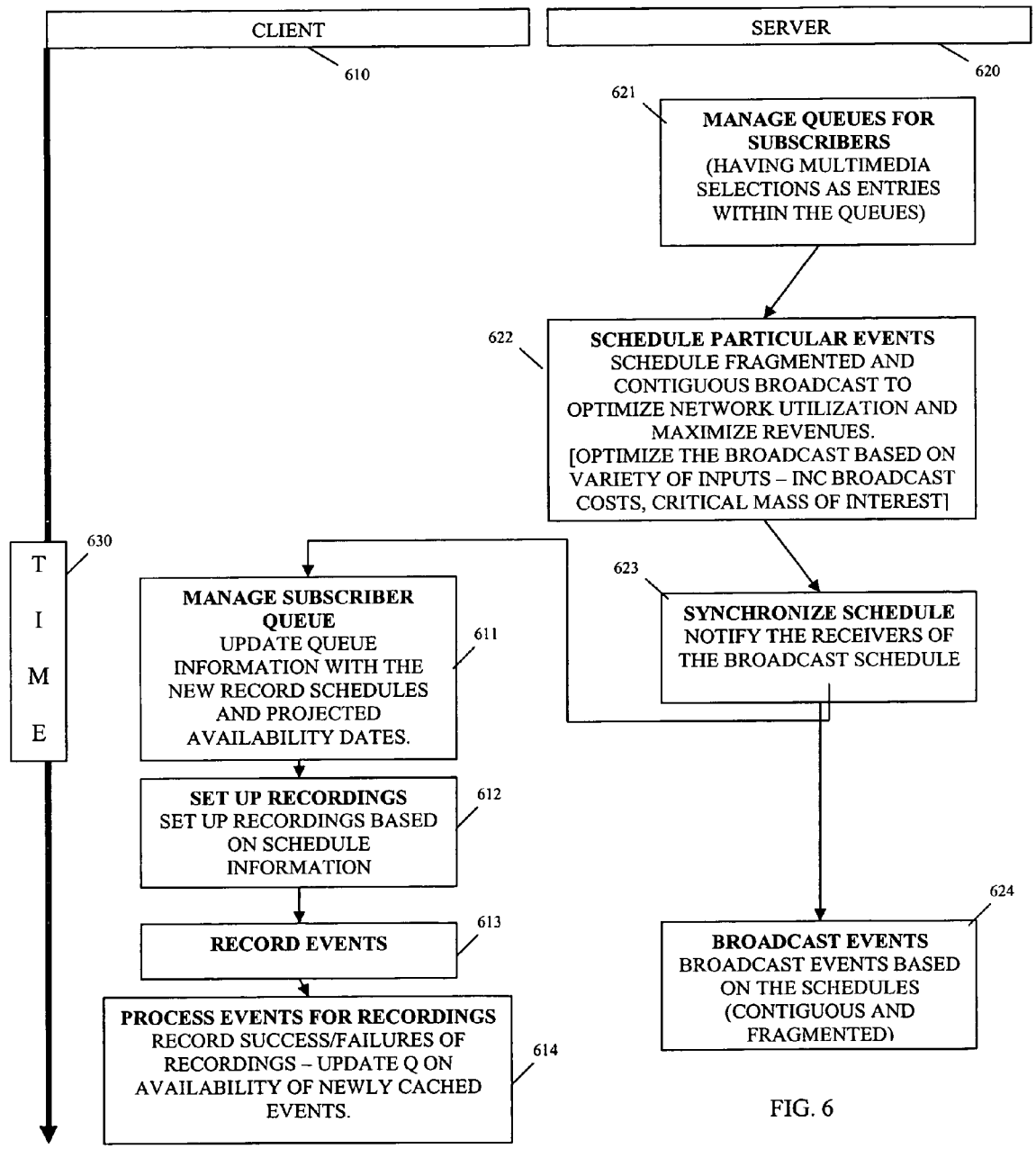
FIG. 6 is a diagram of some resources and a different example perspective of the multimedia queue management service of FIGS. 2 and 5 and the subscriber queue service of FIG. 4, according to an example embodiment.

FIG. 6 is a diagram of some resources and a different example perspective of the multimedia queue management services of FIGS. 2 and 5 and the subscriber queue service of FIG. 4, according to an example embodiment. The resources and processing depicted in FIG. 6 are implemented in machines and/or machine accessible media and are operational to communicate over a network.

The diagram of FIG. 6 is presented for purposes of illustrating processing that may occur on devices of a subscriber, referred to herein as a client 610 and processing that may occur on devices associated with a multimedia queue management service, referred to herein as server 620. The blocks on the left illustrate processing of the client 610 and the blocks on the right illustrate processing of the server 620. Moreover, the order or sequence of processing is vertically illustrated via the time block 630, such that a block occurring at the top of the diagram occurs before a block that appears at the bottom of the diagram.

With respect to the server 620 processing, at 621, queues are managed for subscribers. Again, the queues have multimedia selections as entries within the queues. At 622, particular events are scheduled as contiguous broadcasts or as fragmented broadcasts that may later be assembled. The events are scheduled to optimize network utilization, revenues, and subscriber satisfaction. A variety of factors may be used including costs, critical mass interest, and other factors discussed and enumerated herein and above.

At 623, the schedule is synchronized and receivers or recording devices of the subscribers are notified. Finally, at 624, the events are broadcasts based on the set schedules as contiguous chunks of time or as discontinuous or fragmented portions.

From the client 610 perspective of processing, a subscriber queue is managed at 611, such that subscribers' queues receive updates on information related to their queue entries and with new recording schedules. At 612, recordings are set up on recording devices of the subscriber in response to the schedule information. At 613, the events are recorded on the recording devices or an attempt is at least made to record. At 614, events are processed for the recordings, such as successful recording events or unsuccessful recording events. In some cases, at 614, the queue is updated with availability of newly cached events.

Again, the diagram of FIG. 6 is presented for purposes of illustration and comprehension of the queue management services and the subscriber services of FIGS. 2, 4, and 5.

It is now understood, how multimedia on demand or VOD may be more efficiently achieved via scheduled and controlled broadcasts associated with a broadcaster. This permits better bandwidth management of a network, improves subscriber satisfaction, and maximizes revenue for a broadcaster.

Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A system comprising:
a multimedia queue manager implemented in a computer-readable medium and to execute on a processing device; and
a plurality of queues implemented in a computer-readable medium, the multimedia queue manager being configured to manage the plurality of queues, each queue within the plurality of queues being configured to store metadata that include identifiers of selected multimedia items that have been selected by a different subscriber among a group of subscribers, each queue within the plurality of queues being a different list of identifiers for a different subscriber among the group of subscribers, the multimedia queue manager being configured to schedule a delivery of a common multimedia item whose identifier is stored in each queue within the plurality of queues to a group of devices associated with the group of subscribers, the delivery of the common multimedia item to the group of devices being scheduled based on a number of subscribers in the group of subscribers whose queues each store the identifier of the common multimedia item, the multimedia queue manager being configured to notify the group of devices associated with the group of subscribers as to when the scheduled delivery of the common media item is to occur.

2. The system of claim 1 further comprising, a data store configured to house and index a variety of multimedia items, wherein the data store is to be accessed by the multimedia queue manager to perform the delivery by acquiring the common multimedia item.

3. The system of claim 2, wherein the data store is configured to be presented to the subscribers; and wherein the subscribers select desired multimedia items and insert identifiers of the selected multimedia items into entries of their corresponding queues.

4. The system of claim 1, wherein the multimedia queue manager is configured to direct the devices associated with the group of subscribers to record the common multimedia item.

5. The system of claim 1, wherein the multimedia queue manager is configured to schedule the delivery of the common multimedia item based on at least one of a bandwidth load, a price paid by subscribers for the common multimedia item, wait times experienced by subscribers waiting for the common multimedia item, a probability of a successful delivery based on collected history, or a probability of consumption of a subscriber based on a different collected history.

6. A method implemented in a computer readable medium and to execute on a processing device for performing the method, comprising:

receiving, from each subscriber among a group of subscribers, an identifier of a common multimedia item whose identifier is stored in an entry in each queue among a plurality of queues that respectively correspond to the group of subscribers, each queue within the plurality of queues being configured to store metadata that includes identifiers of selected multimedia items that have been selected by a different subscriber among the group of subscribers, each queue within the plurality of queues being a different list of identifiers for a different subscriber among the group of subscribers;

scheduling a transmission of the common multimedia item whose identifier is stored in each queue within the plurality of queues to a group of devices associated with the group of subscribers, the delivery of the common multimedia item to the group of devices being scheduled based on a number of subscribers in the group of subscribers whose queues each store the identifier of the common multimedia item; and notifying the group of devices associated with the group of subscribers as to when the scheduled transmission of the common media item is to occur.

7. The method of claim 6 further comprising, causing the devices to record the common multimedia item.

8. A non-transitory machine-accessible medium including instructions thereon, the instructions being executable by a machine to perform operations comprising:

managing a plurality of queues for a group of subscribers, each queue among the plurality of queues being configured to store metadata that includes identifiers of selected multimedia items that have been selected by a different subscriber among the group of subscribers, each queue within the plurality of queues being a different list of identifiers for a different subscriber among the group of subscribers;

scheduling when a common multimedia item whose identifier is stored in each queue within the plurality of queues is to be delivered to a group of devices associated with the group of subscribers, the delivery of the common multimedia item to the group of devices being scheduled based on a number of subscribers in the group of subscribers whose queues each store the identifier of the common multimedia item; and notifying the group of devices associated with the group of subscribers to record when delivery of the common multimedia item is scheduled to occur.

9. The non-transitory machine-accessible medium of claim 8, wherein the scheduling includes optimizing the delivery of the common multimedia item based on at least one of a cost to deliver the common multimedia item, a price paid by subscribers for the common multimedia item, a bandwidth load associated with the delivery of the common multimedia item, or schedules of other different deliveries of other different multimedia items.

10. The non-transitory machine-accessible medium of claim 8 further comprising instructions for initiating the delivery of the common multimedia item over a network.

11. The non-transitory machine-accessible medium of claim 10, wherein the scheduling of the delivery includes scheduling a series of sub-deliveries that represent a single delivery.

* * * * *

UNITED STATES PATENT AND TRADEMARK OFFICE
CERTIFICATE OF CORRECTION

PATENT NO. : 9,226,013 B2
APPLICATION NO. : 11/226149
DATED : December 29, 2015
INVENTOR(S) : Nicholas Fishwick Page 1 of 1

It is certified that error appears in the above-identified patent and that said Letters Patent is hereby corrected as shown below:

In the Claims

In column 10, line 58, in Claim 3, before "multimedia", delete "desired", therefor Signed and Sealed this
Thirty-first Day of May, 2016

Michelle K. Lee
*Director of the United States Patent and Trademark Office*